H. C. PRINGLE.
AUTOMATIC VALVE.
APPLICATION FILED JUNE 26, 1916.
1,196,280.
Patented Aug. 29, 1916.
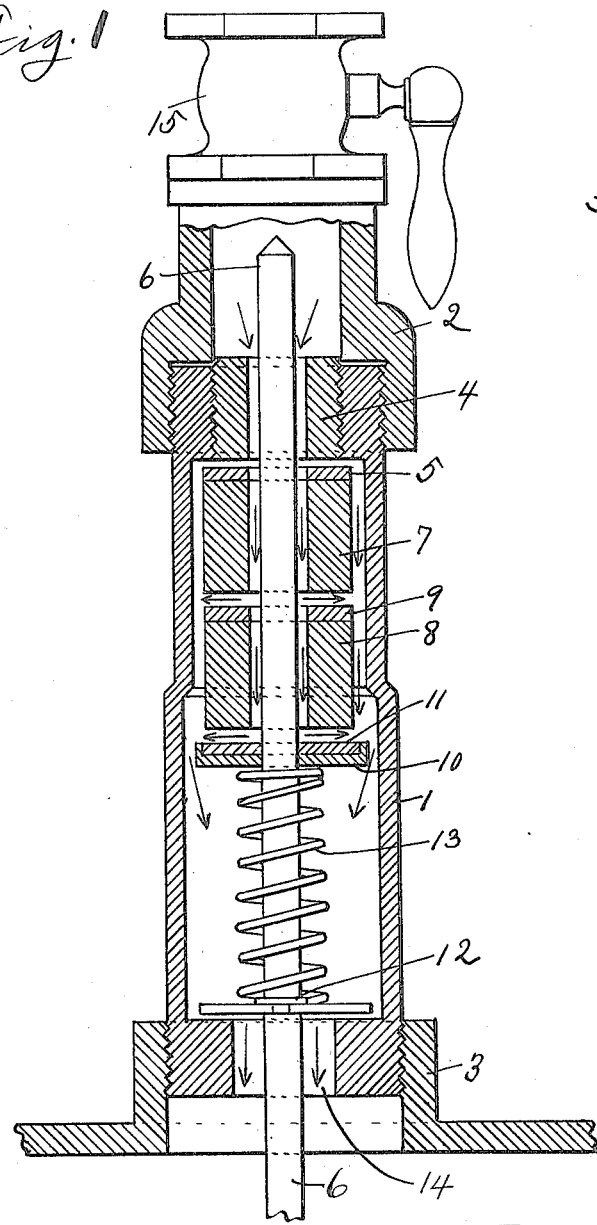
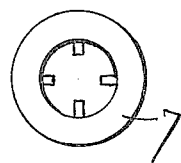
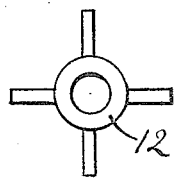
Inventor
H. C. Pringle,
By A. L. Jackson,
Attorney.

UNITED STATES PATENT OFFICE.

HENRY C. PRINGLE, OF FORT WORTH, TEXAS.

AUTOMATIC VALVE.

1,196,280.   Specification of Letters Patent.   Patented Aug. 29, 1916.

Application filed June 26, 1916. Serial No. 105,941.

*To all whom it may concern:*

Be it known that I, HENRY C. PRINGLE, a citizen of the United States, residing at Fort Worth, in the county of Tarrant and State of Texas, have invented certain new and useful Improvements in Automatic Valves, of which the following is a specification.

My invention relates to valves and more particularly to pressure valves for use with compressed fluids; and the object is to provide valves for retaining fluids, such as compressed air and compressed liquids in vessels, and to provide valves which will prevent leakage and which will be closed automatically when the supply of fluid is cut off.

Another object is to provide valves which can be set to resist a predetermined pressure for the purpose of distributing air or other fluids and for controlling fluid pressure, and which can be used as check valves for general purposes.

Other objects and advantages will be fully explained in the following description and the invention will be more particularly pointed out in the claims.

Reference is had to the accompanying drawings which form a part of this application.

Figure 1 is a vertical section of the valve, showing the manner of connecting the valve with a supply pipe and with a vessel which is to contain the compressed fluid. Fig. 2 is a plan view of the spider which serves as a stop for the valve. Fig. 3 is a plan view of one of the movable sleeves.

Similar characters of reference are used to indicate the same parts throughout the several views.

This valve has a casing 1 which is to be connected to a supply pipe 2 and to a vessel 3, being permanently connected to the vessel 3 which is to contain the compressed fluid. The casing 1 is closed partly by a plug 4 which serves as a seat for a gasket 5 and for retaining the sealing devices in the casing. A solid stem 6 is centrally positioned within the casing 1 and serves as a guide for the sealing devices, the plug 4 being centrally perforated for the stem and the stem not being large enough to fill the perforation which is the inlet for the fluid. A brass or other metallic sleeve 7 is mounted on the stem 6. This sleeve is large enough to permit liquid to pass along by the stem 6 and is small enough to let liquid pass between the sleeve and the casing 1. A similar sleeve 8 is mounted on the stem 6 and a gasket 9 of suitable material is mounted on the sleeve 8 between the sleeve 8 and the sleeve 7. A metal cup 10 is rigidly mounted on the stem 6 and a gasket 11 is mounted in the cup and between the cup and the sleeve 8. A spider 12 is loosely mounted on the stem 6 and a spiral spring 13 is mounted on the stem 6 and bears against the spider 12 and the cup 10. Liquid escapes through the spider 12 and through the outlet 14 into a vessel 3. Normally the spring 13 will keep the cup 10 pressing on the gasket 11 and thus force the sleeves 7 and 8 and gaskets 5 and 9 to sealing positions. The fluid pressure from the vessel 3 will also bear against the bottom of the cup 10 and tend to seal the cup and the sleeves against their respective gaskets.

The spring 13 may be made with different tension and larger or smaller. In a series of vessels requiring different pressures, springs may be provided with the necessary tension or resistance.

In operation, the cock 15 will be opened for filling a vessel 3. The fluid will pass down around the stem 6 and through or around the sleeves 7 and 8 and past the cup 10 and out the outlet 14 and as soon as the vessel is filled, the pressure on the sleeves and cup from above will be released. The spring 13 will automatically force the cup 10 and the sleeves 7 and 8 to sealing position. The cock 15 will then be closed. The fluid will be securely held in the vessel 3 because it cannot escape past the sleeves and cups and their gaskets, the spring 13 and the fluid in the vessel pressing against the cup and the sleeves.

What I claim, is,—

1. A valve comprising a casing, a guide stem centrally positioned therein, a perforated plug partly closing the inlet end of said casing and forming a seat, a sleeve loosely mounted on said stem, a gasket to form a seal between said sleeve and said seat, and means carried by said stem for automatically closing said sleeve and gasket on said seat.

2. A valve comprising a casing having an outlet and an inlet end, a perforated plug screwed into the inlet end of said casing, a guide stem centrally positioned in said casing and projecting through said plug, said plug forming a sealing seat, sleeves mounted in said casing and concentrically about said stem, a cup rigid with said stem, a gasket in said cup, a gasket between adjacent sleeves, a gasket between said seat and the adjacent sleeves, and yielding means normally holding said cup and said sleeves in sealing position.

3. A valve comprising a casing having an outlet and an inlet, a perforated plug screwed into the inlet end and forming a sealing seat, a guide stem centrally positioned in said casing and movable therein, a plurality of sealing elements mounted loosely on said stem and having passages therethrough for fluids, and means carried by said stem for automatically closing said sealing elements against said seat.

In testimony whereof, I set my hand this 2nd day of October, 1916.

HENRY C. PRINGLE.

Copies of this patent may be obtained for five cents each, by addressing the "Commissioner of Patents, Washington, D. C."